United States Patent [19]

Landsman

[11] 4,131,916

[45] Dec. 26, 1978

[54] PNEUMATICALLY ACTUATED IMAGE SCANNING READER/WRITER

[75] Inventor: Robert M. Landsman, Annandale, Va.

[73] Assignee: LogEtronics, Inc., Springfield, Va.

[21] Appl. No.: 645,583

[22] Filed: Dec. 31, 1975

[51] Int. Cl.² .............................................. H04N 3/00
[52] U.S. Cl. .................................... 358/285; 358/286; 358/256; 358/264; 358/290
[58] Field of Search ................... 178/6, 6.9, DIG. 28, 178/7.6, 69.5 F; 358/290, 264, 256, 285, 286, 128

[56] References Cited

U.S. PATENT DOCUMENTS

| | | | |
|---|---|---|---|
| 2,450,649 | 10/1948 | Finch | 358/289 |
| 2,540,922 | 2/1951 | Wickham | 178/69.5 F |
| 3,381,085 | 4/1968 | Johnson | 358/128 |
| 3,720,924 | 3/1973 | Aagard | 358/128 |
| 3,809,806 | 5/1974 | Walker | 178/7.6 |
| 3,816,659 | 6/1974 | Landsman | 178/7.6 |

Primary Examiner—Robert L. Griffin
Assistant Examiner—Edward L. Coles

Attorney, Agent, or Firm—William D. Hall; Geoffrey R. Myers

[57] ABSTRACT

A hollow tubular shaft, containing optical elements for use in a helical scanning facsimile transceiver, is supported horizontally by air bearings and translated linearly along its major axis through cylindrical reading and writing stations by means of a pneumatic cylinder and piston coaxial with the shaft. An integral reaction-powered air motor provides shaft rotation, and laser beams perform the reading and writing operations, both of which may take place within the same apparatus or either one of which may be executed at a location remote from that of the other.

The reading station contains an optical encoding pattern enabling continuous control of the position of the radiation beams relative to the indicia being read, and an electronic memory facilitates the temporary storage and manipulation of information to be recorded by the writing station. A fail-safe system prevents damage to the scanning mechanism in the event of interruption of the pneumatic or electrical supplies. The apparatus finds particular utility in the production of printing plates for use in Graphic Arts reproduction processes.

35 Claims, 5 Drawing Figures

PNEUMATICALLY ACTUATED IMAGE SCANNING READER/WRITER

RELATED U.S. APPLICATION DATA

My prior copending application Ser. No. 485,178, filed July 2, 1974, entitled "Method and Apparatus for Making a Printing Plate From a Porous Substrate."

BACKGROUND OF THE INVENTION

Systems which read and write images by scanning, for use in the point-to-point transmission and reception of graphic and other indicia of various types, including pictorial and textual matter, take many forms and are generally old and well-known in the art, as typified by the following references:

Young, U.S. Pat. No. 2,394,649, issued Feb. 12, 1946, for "Scanning Apparatus."

Young, U.S. Pat. No. 2,532,799, issued Dec. 5, 1950, for "Facsimile System Having a Rotating Scanner Moving Longitudinally Within a Stationary Transparent Drum."

Artzt et al., U.S. Pat. No. 2,569,648, issued Oct. 2, 1951 for "Facsimile System and Apparatus."

Stephens et al., U.S. Pat. No. 3,622,222, issued Nov. 23, 1971 for "Electronic Scanner Utilizing a Laser for the Simultaneous Scanning and Reproduction of Images."

Furthermore, my U.S. Pat. No. 3,816,659 issued June 11, 1974 for "Scanning Apparatus," which is now assigned to the assignee of this application, discloses an earlier apparatus suited to either the reading or writing of graphic and other indicia by a facsimile method.

A primary objective of this invention is to provide a low cost combined ready and/or writing facsimile apparatus having particular utility in the preparation of printing plates for use in the Graphic Arts, and especially in the newspaper industry.

It is a further objective of this invention to provide combined facsimile reading (transmission) and/or writing (recording) apparatus of relatively simple construction.

An additional objective is to reduce the number of moving parts required to perform the scanning operations in a fascimile transmitter and receiver.

Another objective is to enable the use of simple optical systems in the electro-optical and reading and/or writing of large area, high resolution images.

Yet another objective is to improve the geometric accuracy and efficiency with which facsimile information is transmitted and received.

Still a further objective is to provide a scanning system having smooth and accurately controlled motions to thus obtain clear and accurately reproduced images.

Other objects, features and benefits of the apparatus will become apparent from the description and claims which follow.

SUMMARY OF THE INVENTION

A pneumatically actuated apparatus for the electro-optical reading and writing of graphic indicia by helical raster scanning is comprised of a first stationary semi-cylindrical member for supporting the image bearing material which is to be read photoelectrically when illuminated by a beam of reading radiation; a second stationary cylindrical or semi-cylindrical member having its major axis aligned with that of the first semi-cylindrical member for supporting material to be modified when exposed to a radiant energy writing beam modulated by the information which is to be recorded; and an intervening elongated optical scanning member positioned for concentric rotation about, and translation along, the common axis joining the two stationary members.

Optical components contained within the scanning member are used to focus individual collimated beams of radiation on the reading and writing surfaces and, by the action of electro-pneumatic control systems, the scanning member may be caused to execute simultaneous image reading and writing operations. Additional means are provided for generating output signals containing linear and angular position and velocity information concerning the instantaneous location of the scanning beams relative both to a stationary encoding pattern and to the other materials being scanned, and for the synchronous transmission and reception of such graphic indicia between like apparatus at different locations. The writing of computer-stored or otherwise "memorized" indicia is also contemplated.

DESCRIPTION OF THE PREFERRED EMBODIMENT

Figure 1:
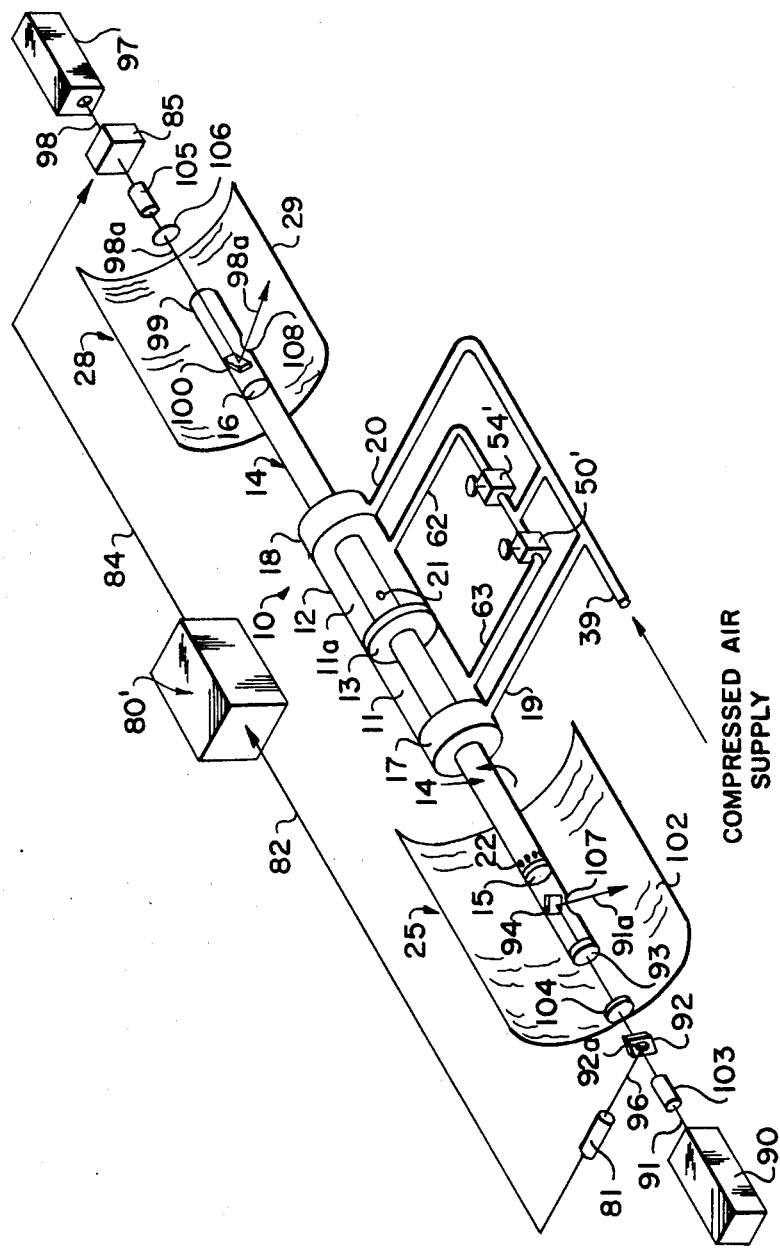
FIG. 1 is a perspective view of one possible embodiment of the facsimile apparatus of the present invention.

FIG. 1 illustrates a simplified facsimile apparatus, or "electronic camera," constructed in accordance with one form of the present invention wherein graphic or other indicia may be transferred electro-optically, by synchronous helical scanning in real time, from a reading station to a recording material contained in an adjacent image reproducing station within the apparatus. The optomechanical portion of the system is comprised of three major components, each of generally cylindrical configuration, namely: a copy reading station 25; a pneumatically-actuated scanning drive system 10; and an image writing station 28; all of which are assembled in horizontal end-to-end relationship and aligned about a single mechanical and optical axis.

Referring first to the scanning drive system 10, a pneumatic cylinder 12 is substantially closed at its ends by conventional annular air bearings 17, 18 (such as Model No. B-2348, of Dover Instrument Corp. Waltham, MA.) which, when energized by compressed air supplied from an external pneumatic source (not shown) over lines 39, 19 and 20 provide essentially friction-free support for an elongated, tubular optical scanning member 14 to the mid-point of which there is secured, in substantially friction-free pneumatic pressure sealing relationship with the interior wall of cylinder 12, a disc-shaped piston or pressure plate 13. When the air bearings are adequately pressurized they support member 14 and render it free to rotate and/or translate axially within cylinder 12, and also minimize the escape of air laterally therefrom.

Air line 39 also supplies compressed air via control valves 50', 54' and lines 63, 62 to chambers 11, 11a (separated by piston 13) of pneumatic cylinder 12, where it effects axial translation of shaft member 14 through bearings 17, 18 and provides motive power for rotation of the shaft. Within drive system 10 the hollow shaft 14, which is sealed by internal airtight barriers 15, 16 is powered for smooth rotation about its major axis by an integral air motor 22 which receives compressed air from chamber 11a of cylinder 12 via manual control valve 54', adjustment of which varies the speed of shaft rotation. The air is introduced into member 14 through entry orifice 21 and is vented to the atmosphere only through a circumferential ring of jet-producing holes 22, each inclined tangentially with respect to radii of shaft 14 to provide the reaction torque which rotates the shaft at a speed which is a function of the applied air pressure.

Figure 3:
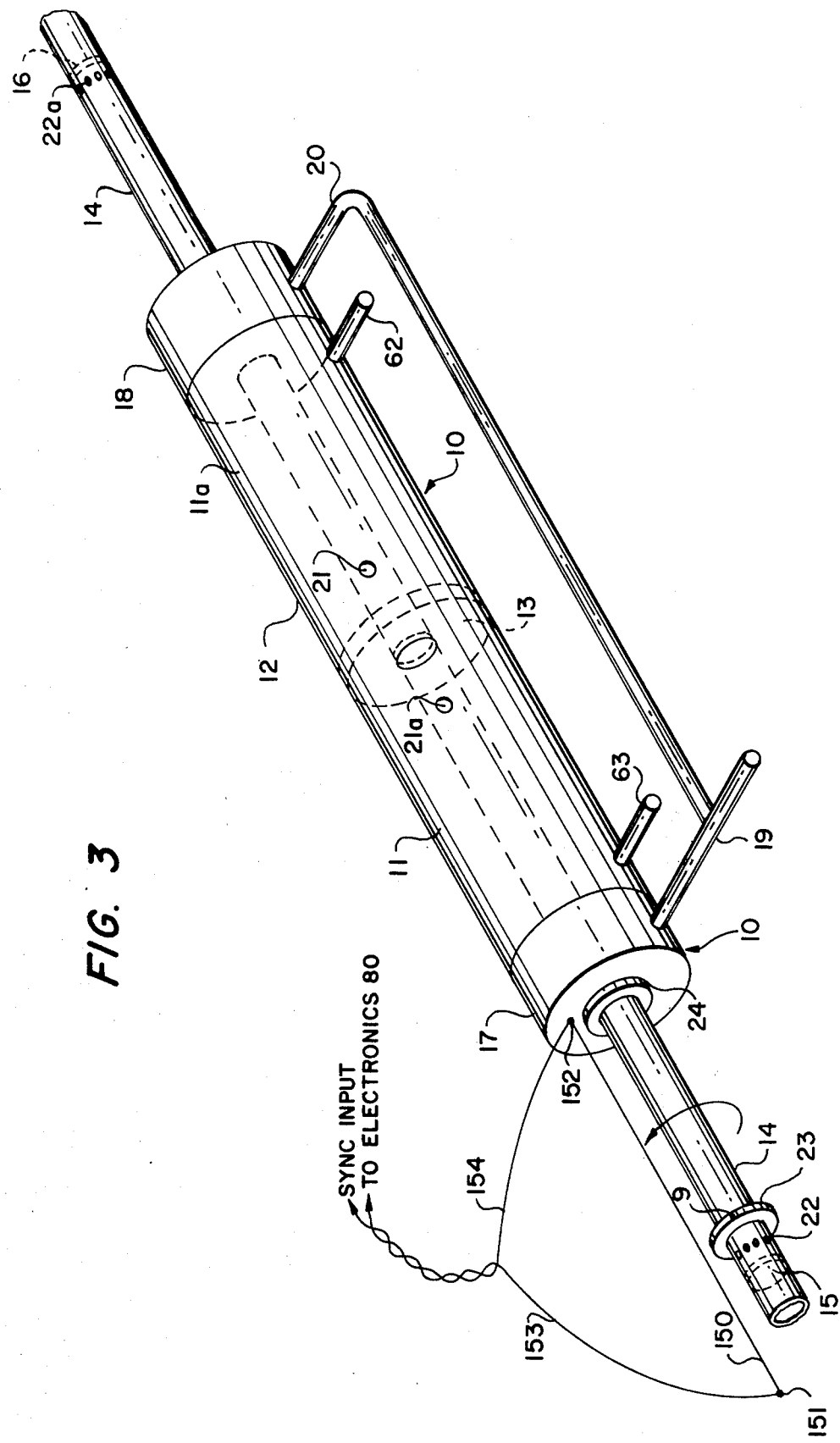
FIG. 3 is a perspective view of a modified form of the scanning drive system of the present invention, incorporating dual air motors.

Prior to commencing a scanning operation the pneumatic pressure in chamber 11a of cylinder 12 is adjusted, by manipulation of valve 54', to obtain the desired speed of rotation of shaft 14 while, simultaneously, the pressure in chamber 11 is similarly changed--by adjustment of valve 50'—to prevent translational motion of the shaft. In order to execute a scanning operation from right to left, for example, the pressure in chamber 11 must be progressively reduced, by continuous adjustment of valve 50', to enable piston 13 to move at the desired rate of line advance from its initial position in the vicinity of bearing 18 to a final position in the vicinity of bearing 17, thereby causing indicia-bearing material 102 to be helically scanned by the beam 91a of reading radiation in station 25. Shaft 14 may then be returned to its initial position, or to any desired, intermediate translational position, by increasing the pressure in chamber 11 to counterbalance the steady pressure in chamber 11a. A somewhat similar translational mechanism is shown in Bruck, U.S. Pat. No. 3,806,208, issued Apr. 23, 1974 for "Hydrostatic Bearing Systems." Furthermore, and as is shown in FIG. 3, it would be possible—if required—to provide shaft 14 with an additional air-entry orifice 21a on the left side of piston 13 and a second air motor 22a near the opposite end of shaft 14, in order to produce a rotational system having more precisely balanced pneumatic characteristics.

Figure 4:
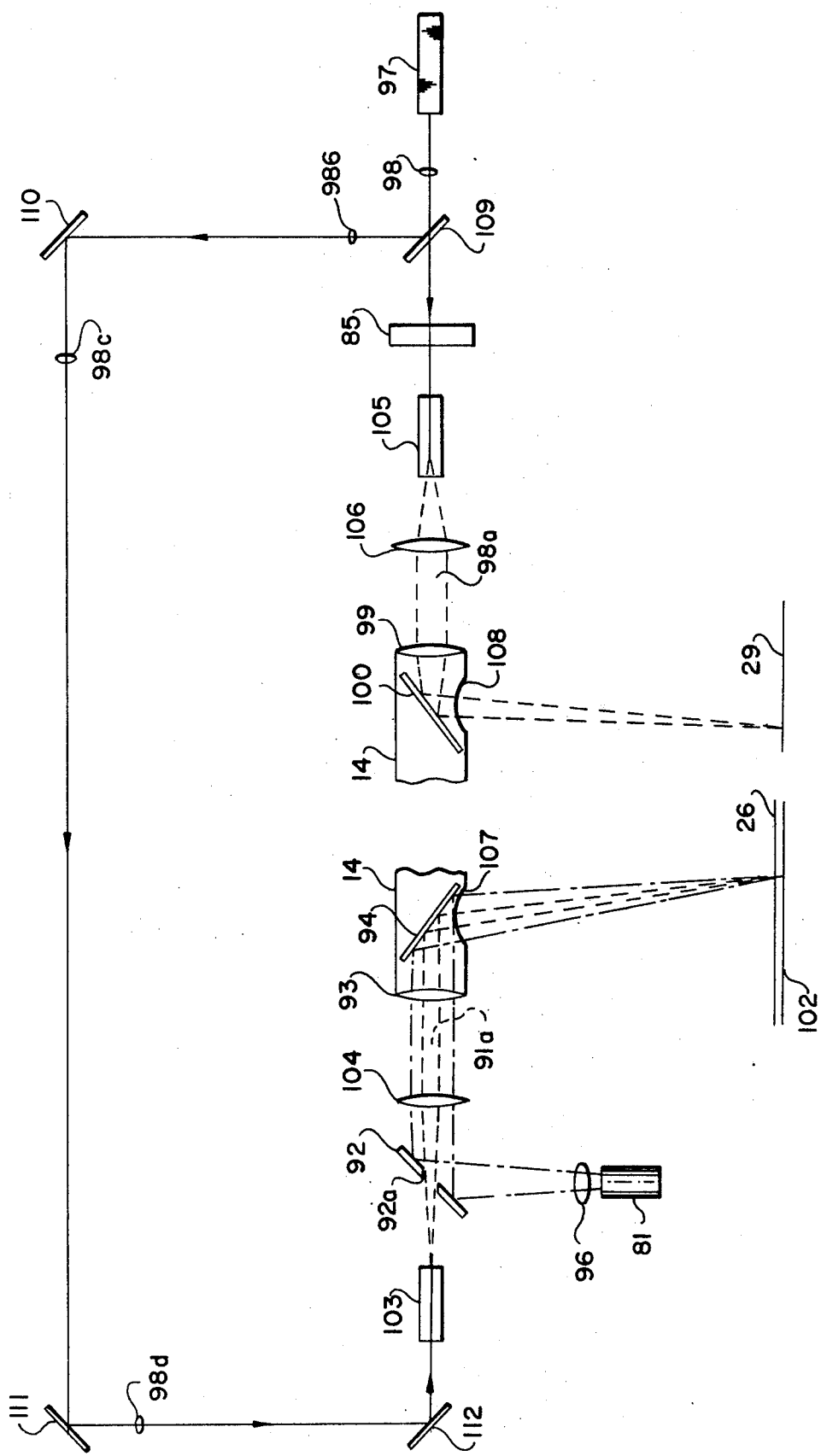
FIG. 4 is a schematic diagram of a modified form of the optical configuration for use in the apparatus of FIG. 1 or FIG. 2.

Copy reading station 25 contains an elongated, arcuately-shaped platen (not shown) for supporting a sheet 102 bearing line or halftone indicia at the focal point of the optical reading system. The beam of copy reading radiation 91 from a light source such as helium-neon laser 90 is aligned axially with that end of member 14 which extends into reading station 25 and, after slight broadening due to its passage through beam expander 103 (such as Model B-34-60 of Oriel Corp., Stamford, CONN.), beam 91 passes through the central aperture 92a in angled mirror 92 and is collimated by lens 104, thereby minimizing variations in the focal point of the scanning spot as member 14 translates. The collimated beam 91 is focused on the front surface of copy 102 by means of a lens 93 and angled mirror 94, both of which are mounted inside scanning member 14. As is best shown in FIG. 4, mirror 94 is set at an angle other than 45° to the common optical axis in order to minimize the response of photodetector 81 to specular reflections from the front surface of copy 102, and an angle of 52° has proven satisfactory for this purpose. Mirror 94 reflects beam 91a radially through a transparent aperture 107 in the sidewall of member 14, enabling it to impinge upon copy 102.

A portion of the light from beam 91a, after being modulated in intensity by variations in the reflectivity of copy sheet 102, is re-received by mirror 94, collimated by lenses 93 and 104, and intercepted and reflected by the annular portion of angled mirror 92 along path 96 to reading photodetector 81, where it is converted into a varying video signal on conductor 82 of electronic system 80'. An alternate copy reading optical system capable of providing an image of enhanced contrast at photodetector 81 may employ a laser 90 having a polarized radiation beam (such as Model 3124 H-P of Hughes Aircraft Corp., Torrance, CA.), in which event annular mirror 92 is replaced by a polarizing beam splitter cube (such as Part No. 675-3405 of Perkin-Elmer Corp., Norwalk, CT.).

Within electronic circuit 80' the video signals received over conductor 82 from photodetector 81 as a result of helical scanning of the line-type indicia present on copy sheet 102 are amplified by a conventional video amplifier, and then fed over conductor 84 to an acousto-optical light modulator 85 (such as Model DLM-1-IR of Datalight, Inc., Bloomfied, CT.) which is located in the path of an image writing radiation beam 98 generated by a laser 97 having a spectral output and power density suited to the non-linear imaging characteristics of material 29 (such as the offset lithographic printing plate described in my co-pending U.S. patent application Ser. No. 459,039 "Printing Plate Blank and Image Transfer Sheet Therefor" filed Apr. 8, 1974 and now U.S. Pat. No. 3,945,318, issued Mar. 23, 1976).

The modulated radiation beam emerging from modulator 85 is broadened slightly by its passage through beam expander 105, and is collimated by lens 106. The collimated beam 98a is then directed along the axis of scanning member 14 and refocused by lens 99 on the radiation responsive material 29 for recording thereon a representation of the graphic indicia contained on copy sheet 102. An intervening mirror 100, which is positioned angularly as taught by my previously-mentioned U.S. Pat. No. 3,816,659, is used to reflect beam 98a radially through a transparent aperture 108 in the sidewall of member 14.

While the apparatus of FIG. 1 performs the basic electronic image dissection, transfer and reconstruction functions which characterize the facsimile art, its operating efficiency and commercial utility are compromised by the need for manual adjustment of valve 50' in order to control the translational motion of shaft 14; by its ability to write only those line and halftone images which are customarily reproduced by lithographic and other high-contrast reproduction processes; and by its inability to operate in synchronism with similar reader/writer apparatus in a facsimile mode. All of these deficiencies are overcome in the preferred apparatus shown in FIG. 2 wherein electro-pneumatic servo systems provide accurate automatic control of the linear translation and speed of rotation of scanning shaft 14, and the electronic system 80 is capable of processing the video signals from detector 81 to suit the characteristics of line, halftone, continuous tone or other indicia 102, which may be reproduced on any one of a wide variety of image receptive materials 29 such as silver halide, diazo, or those described in the following disclosures:

Landsman, U.S. Pat. No. 3,739,088 issued June 12, 1973, entitled "Printing Plate Production Method and Apparatus,"

Landsman, U.S. Pat. No. 3,742,853 issued July 3, 1973, entitled "Method of Forming Relief Printing Plate,"

Landsman, U.S. Pat. No. 3,779,779 issued Dec. 18, 1973, entitled "Radiation Etchable Plate,"

German Offenlegungschriften DT 2500-905, filed July 24, 1975;

German Offenlegungschriften DT 2500-906, filed July 24, 1975.

The improved apparatus is capable of operating from composite video and synchronizing data received over conductor 83 from an external computer or memory storage means, or from similar external image scanning reader/writer apparatus; and of feeding internally generated video and synchronizing data over conductor 89 to a compatible device such as, for example, a duplicate remotely located reader/writer.

Figure 2:
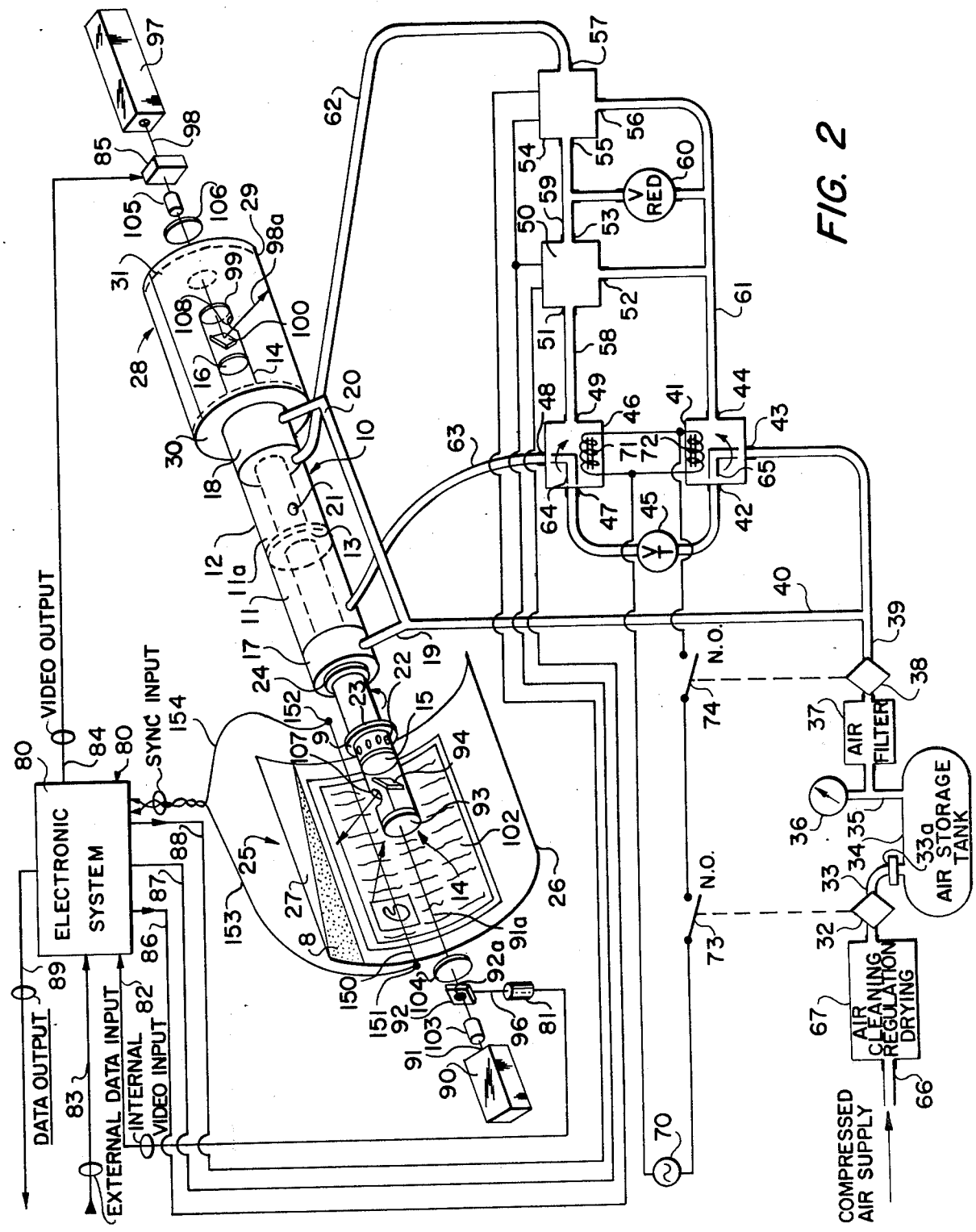
FIG. 2 is a perspective view of a system incorporating the present invention.

The copy reading station 25 of FIG. 2 contains elongated, arcuately shaped supporting structures for the material to be scanned, and includes a rectangular encoding pattern which is divided diagonally to form two optically contrasting triangles 27, 8. Also located in station 25 is a flexible, optically transparent cover sheet 26 behind which the line, halftone, textual or other copy material 102 is secured, by means not shown, for scanning by laser beam 91a. As is generally disclosed in my previously mentioned U.S. Pat. No. 3,816,659, the encoding pattern 27, 8 provides reflective signals to photodetector 81 which define the translational and rotational rates of scanning member 14.

Station 25 also contains a magnetically operated synchronizing pulse source in the form of an electrical conductor 150 supported under tension between fixed terminal points 151, 152 and connected, via lines 153, 154 to electronic system 80. Conductor 150 is positioned proximate to the translational path of a small permanent magnet 9 embedded in the periphery of a brake ring 23 which is mounted on rotary scanning shaft 14, so that once-per-revolution current pulse induced in conductor 150 by magnet 9 occurs simultaneously with the passage of reading laser beam 91a over the upper edge of encoder pattern 27, thereby providing a time reference signal which identifies the commencement of each scan line of the video data generated by photodetector 81.

At image writing station 28 the stationary circular end plates 30, 31 by means of which the edges of a flexible sheet of image receptive material 29 are retained, aligned and supported to form either a partial or complete cylinder, are each provided with a central, circular aperture through which scanning member 14 is free to translate during operation of the apparatus. It would, of course, be possible to automate the loading and unloading of copy sheet 102 and/or image receiving sheet 29, and to provide a capability for simultenously accommodating more than one such sheet in each station. Moreover, image writing station 28 could be replaced by a second image reading station 25 or, conversely, reading station 25 could be replaced by a second writing station 28, if required. Furthermore, because it may be desirable to maintain certain types of copy material, particularly those of the "paste-up" variety, in a relatively flat physical condition whenever possible, the radius of curvature imparted to copy 102 when it is secured behind support sheet 26 in reading station 25 may be relatively benign and substantially greater than (e.g. twice as great as) the radius of curvature of the image receptive material 29 employed in writing station 28. In this event a read/write electronic memory system is employed to temporarily store the video data in quantized form, on a line-by-line basis, and to write out such data synchronously, but at a proportionately reduced rate (e.g. at half the reading rate), to modulator 85 in order to compensate for the lengthwise shrinkage of each scan line of the written image which would otherwise result. Furthermore, by modifying the rate at which video data is written from the memory it is possible to provide unidirectional shrinkage or stretch (anamorphism) of the recorded image and, by writing each line of video data in the reversed time sequence (i.e., last in/first out of memory) to produce a mirror reproduction of copy 102 on image receptive material 29.

In FIGS. 1 and 2 it is to be understood that lens 93, mirror 94, aperture 107, barrier 15, motor orifices 22, brake ring 23, piston 13, air orifice 21, barrier 16, mirror 100, aperture 108 and lens 99 are all fixed to, or parts of, tubular scanning shaft 14 and rotate as well as translate with member 14. All other parts of the apparatus are normally stationary and are supported in fixed relation to each other. Finally, it is possible to modify the optical system to enable the reading and writing functions to be performed by a single laser, if required, by employing the optical configuration shown in FIG. 4 wherein a small portion 98b of the radiation beam 98 of laser 97 is diverted, by means of the beam splitting mirror 109 and a secondary optical path including mirror 110, 111 and beams 98c, 98d to mirror 112 where it can perform a function similar to that of beam 91 associated with reading laser 90, as previously described with reference to FIG. 1.

Turning now to the pneumatic control system for member 14 in FIG. 2, it can be seen that compressed air supplied by a source external to the apparatus is introduced through input air line 66 and passes through a sequence of air cleaning, drying and pressure regulating devices shown generally at 67. The conditioned air then travels through a first pneumatic pressure-controlled switch actuator 32 provided with normally-open electrical switch contacts 73 which are set to close at and above a desired pressure (such as 60 PSIG) and charges air storage tank 34 over line 33 via check valve 33a. Tank 34 is equipped with an output air line 35 having a dial-type pressure gauge 36, a final air filter 37, and a second pneumatic pressure-controlled switch actuator 38 provided with normally-open electrical switch contacts 74 set to close whenever the pressure in output line 39 reaches or exceeds a desire value (such as 55 PSIG).

Each time the apparatus is placed in its start-up mode the pressure in air line 40 gradually increases until air bearings 17, 18 become activated via lines 19, 20 thereby elevating scanning member 14 to a free position as previously described. Compressed air is also supplied via line 39 to the input port 43 of a first bi-directional air control valve 41 (such as the Model A3DB2 127 of Skinner Electric Valve Company, New Britain, CT.) actuated by an electric solenoid 72, where it flows through air diverter means 65 to a first output port 42. Port 42 is connected, by means of a manually-adjusted preset throttle valve 45, to a first input port 47 of a second two-way air valve 46 actuated by electric solenoid 71, where the air flows through air diverter means 64 to output port 48. Air from port 48 then flows through line 63 to pressurize chamber 11 of pneumatic cylinder 12. The resulting pressure gradient generated between chambers 11, 11a acts on piston 13, causing scanning member 14 to translate toward writing station 28 until its metallic brake ring 23 seats against stationary brake pad 24, thereby arresting member 14. Because the air in chamber 11a is at approximately room ambient pressure at this time, the rate at which member 14 translates is governed by the preadjusted degree of opening of throttle valve 45.

When the air pressure at the input and output of storage tank 34 reaches a desired value such as 60 PSIG, the normally-open series-connected switches 73 and 74 associated with pneumatic actuators 32, 38 respectively, close and complete an electrical circuit from power source 70 to the parallel-connected solenoid coils 71, 72 of air-control valves 46, 41. The energization of these coils causes air diverters 64, 65 to assume their alternate positions, establishing new air paths to cylinder 12. A first such air path includes line 39, diverter 65 and ports 43, 44 of valve 41, and line 61 which supplies the first input ports 52, 56 of current-to-pressure transducers 50, 54 (such as the Model T 5120-1 of Fairchild Instruments, Winston-Salem, N.C., each of which contains an electrically-modulated pilot valve and a pneumatically-controlled booster valve, coupled in tandem) as well as the high-pressure side of reduction valve 60. Pressure modulated air from port 51 of transducer 50 is fed over line 58 to a second input port 49 of valve 46, where it passes through diverter 64, output port 48, and line 63 and flows into chamber 11 of cylinder 12. A second air path from line 61, through ports 56, 57 of current-to-pressure transducer 54, supplies modulated air over line 62 to pressurize the remaining chamber 11a of cylinder 12, thereby also supplying pressurized air to air motor orifices 22 via air entry hole 21 and enabling scanning member 14 to commence rotation as soon as it has translated (due to the rising pressure differential between chambers 11a and 11) sufficiently far toward reading station 25 to disengage brake means 23, 24.

Transducers 50, 54 electro-mechanically modulate the pneumatic pressures applied to chambers 11, 11a of cylinder 12 in order to control the translation and speed of rotation of scanning member 14. The associated electrically-controlled pilot valves are fed with air at about 20 PSIG via reduction valve 60, line 59 and second input ports 53, 55 and the transducers exhibit an overall pneumatic sensitivity of approximately 27 PSI per milliampere of input control current applied from the electronic system 80 via conductors 86, 87 and 88 respectively.

In the event of a sustained interruption of either the incoming electrical power or the pneumatic supply source, or the simultaneous failure of both, a fail-safe system which includes tank 34 will continue to furnish pressurized air to cylinder 12 and air bearings 17, 18 for several minutes, enabling the rotation of member 14 to be brought to a stop before it makes physical contact with the air bearings. The sequence of events following an electrical power failure only, or a combined electrical and pneumatic supply failure, is as follows:

a. Solenoid coils 71, 72 immediately become de-energized and cause valves 46, 41 to return to their initial positions, thereby removing the air supply from lines 61, 62 and coupling line 63 direct to line 39 to unbalance the pressure differential between chambers 11, 11a of cylinder 12.

b. Member 14 then translates toward writing station 28 until brake 23, 24 becomes energized, thereby stopping its rotary and translational motion.

c. Member 14 remains supported within air bearings 17, 18 until the pressure in line 39 falls almost to the room ambient pressure, at which time it settles gently into physical contact with these bearings.

Figure 5:
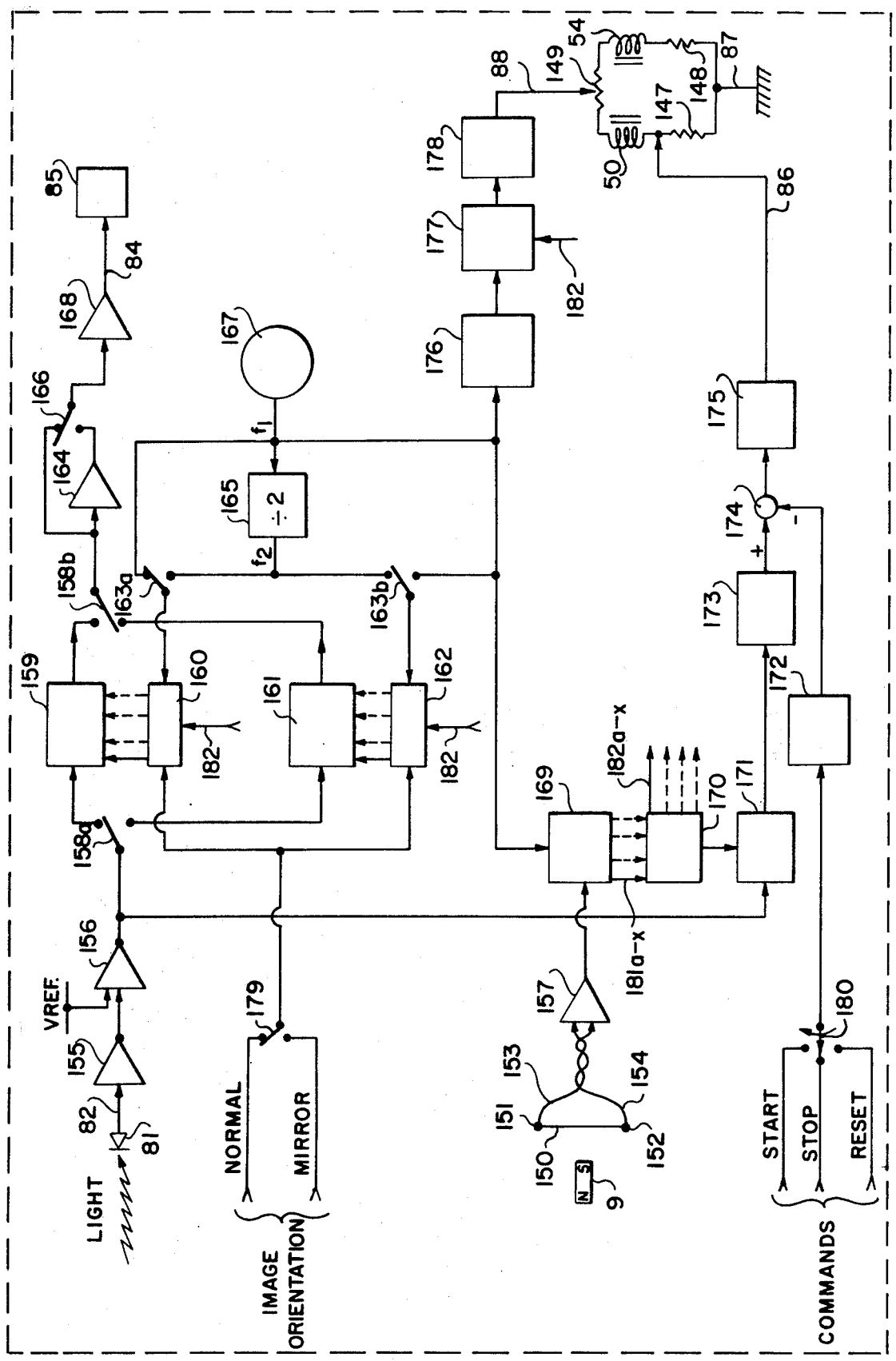
FIG. 5 is a block diagram of the electronic system shown in the perspective view of FIG. 2.

In the electronic system 80 of FIG. 2, which is shown in block diagram form in FIG. 5, the line-by-line video signals generated by photodetector 81 as a result of sequential reflective scanning of the optical encoding pattern 27, 8 and line-type copy 102 in reading station 25, are amplified by preamplifier 155 to an amplitude such as 5 volts peak-to-peak and then applied to one input of a voltage comparator 156. A fixed reference voltage $V_{ref}$, such as 2.5 volts, is the second input to comparator 156, so that when the video input signal amplitude exceeds $V_{ref}$ an output signal level of about 5 volts is provided, whereas when the input signal is less than $V_{ref}$ the comparator output voltage is essentially zero. Thus, the output of comparator 156 is a sequence of voltage transitions which constitute a quantized electrical representation of the two different reflectivity levels exhibited by the line-type copy 102 scanned by reading laser beam 91a.

As was explained heretofore, a magnet 9 mounted on scanning shaft 14 rotates in close proximity to conductor 150 and generates therein a once-per-revolution pulse voltage which is conveyed by conductors 153, 154 to the input of synchronizing pulse amplifier 157. The amplified pulse is used to reset counter 169, driven by clock 167, to zero at the commencement of each scan line over pattern 27, 8 and copy 102, so that if shaft 14 is rotating at a constant speed counter 169 will count through a series of numbers each one of which will uniquely identify one particular angular position of shaft 14 and laser beam 91a. Such output signals are delivered over individual ones of a multiplicity of output conductors identified as 181 a–x.

The program logic array 170 is driven by signals received from counter 169 over appropriate ones of conductors 181a–x and contains a predetermined series of numbers. Array 170 provides an output signal, on an appropriate one of a group of output conductors identified as 182a–x, whenever coincidence is obtained between a count received from counter 169 and one of the preset numbers contained within logic array 170. These signals are used individually to control the functioning of each circuit which is required to operate in synchronism with an instantaneous angular position of shaft 14, such as the scan line starting and stopping positions at which video data is to be read into the dual memory storage 159 or 161 via address counter 160 or 162 and electronic selector switches 158a and 163a or 163b; the time during which video data is to be read from memory via electronic selector switches 158b and 163a or 163b; the rotational error signal derived from shaft 14, which is fed over conductor 182 to phase detector 177 for control purposes; and the enabling signal for application to synchronizing gate 171 whenever laser beam 91a is traversing the triangular encoding pattern located in the focal plane of reader 25.

Quantized composite video signals from voltage comparator 156, and the enabling signal from program logic array 170, are applied to the inputs of synchronizing gate 171, and the resulting separated output (in the form of encoder pattern signals only) is coupled to a pulse-width-to-voltage converter 173 which develops an output voltage proportional to the ratio between the durations of the two signals generated by photodetector 81 as the adjacent optically-contrasting segments of encoding pattern 27, 8 are scanned by laser beam 91a. This output voltage, which varies as a function of the linear position of beam 91a relative to pattern 27, 8 is summed at junction 174 with a reference voltage, provided by ramp generator 172, which varies linearly with time and is initiated by a "start" command received from the equipment operator, via switch 180, at the commencement of each complete scanning sequence. The resulting error signal is amplified and filtered by a circuit 175 which embodies the phase-locked loop principles described in Technical Bulletin AN-535 (Motorola Inc., Phoenix, AZ) and provides an output control current on conductor 86 which is applied to electro-pneumatic transducer 50 to modulate the air pressure differential between chambers 11, 11a of cylinder 12 in a direction which will minimize any error in the translational position of scanning member 14 relative to encoder pattern 27, 8 and copy sheet 102. In the event that the dual air motor configuration shown in FIG. 3 is incorporated in shaft 14 it would be advantageous to add a unity-gain inverting amplifier having its input connected to the junction of transducer coil 50 and resistor 147, and its output connected to the junction of transducer coil 54 and resistor 148, in order to minimize any pneumatic interaction between the rotary and translational control loops which might otherwise result.

Each of the electronic switches 158a, 158b and 163a, 163b is operated in synchronism with alternate revolutions of scanning shaft 14 to enable, for example, a complete scan line of quantized video data to be read into memory 159 while, concurrently, the preceding line of video data is being read out of memory 161 to drive the acousto-optical modulator 85 as previously described. The lines of video data are generated at a rate which is a combined function of the resolving power and angular velocity of laser beam 91a and the radius of curvature of copy 102 in station 25, and are read into the selected memory via switch 158a at a rate (such as 9 megabits/sec.) derived from data clock 167 via switches 163a or 163b. Similarly, and provided that the radius of curvature of copy 102 corresponds to that of image receiving material 29 and thereby results in a 1:1 read/write dimensional ratio in the line scan direction, the lines of video data may be extracted alternately from the memories at the data clock rate $f_1$, via electronic switches 158b and 163a or 163b. However if, as is shown in FIG. 2, the radius of curvature of copy 102 differs from that of reproduction material 29 (e.g., is twice as great) then the data readout rate must be reduced proportionately (e.g., by the inclusion of a 2:1 frequency divider 165 in data clock line $f_2$ to the memories) in order to preserve the 1:1 read/write dimensional relationship in the line scan direction. The substitution of other appropriate memory clock frequencies for $f_2$ would allow reproductions to be obtained at dimensional ratios other than 1:1 in the line scan direction and, if two such reader/writer units are operated in a transmit/receive facsimile mode, control of the reproduction ratio in the translational direction of scanning could be effected by introducing appropriate differences between their translational scanning rates.

Line-by-line synchronization of the memorized video data is obtained by releasing the reset line of the selected address counter 160 or 162 at the appropriate angular position during each revolution of scanning shaft 14, as determined by signals received over conductors 182 from program logic array 170. Also, an operator-adjusted switch 179 permits the address counters to be suitably enabled to allow video data to be read from memory in a reversed sequence (last in, first out), thereby causing a mirror image of copy 102 to be written by laser beam 98a in station 28. If required, the video data may be fed through a unity gain polarity inverter 164, via switch 166, before being sent to the drive amplifier 168 of acousto-optical modulator 85 to control the intensity of laser beam 98a, thereby allowing the writing of either a positive or a negative image on information receptive material 29. Also, if it is required to reproduce images from an original 102 having continuous tone characteristics this may be done either by feeding the analog video signals from preamplifier 155 direct to the input of the driver amplifier 168 of a linearized acousto-optical modulator 85 or, alternatively, by changing voltage comparator 156 to an N-bit parallel A-D converter, the output of which would be fed to an M-word, N-bit dual memory 159, 161 wherein each address location would contain the quantized grey level for one picture element of original 102. In the latter event it would also be possible to control the dimensions of the image recorded on material 29, as was previously described.

The speed of rotation and phase of scanning member 14 are stabilized by comparing, in phase detector 177, the once-per-revolution rotational error signal obtained on conductor 182 from program logic array 170 with a reference pulse obtained from frequency divider 176 by appropriately counting down the output frequency $f_1$ of clock 167. When these two signals are not coincident an error signal is developed which, after processing in circuit 178 in accordance with the procedures described in the previously mentioned phase-locked loop disclosure of Motorola, Inc., provides a control current on conductor 88 which is applied to an electrical bridge circuit comprised of rotary balance potentiometer 149, the operating coils of electro-pneumatic transducers 50, 54 and current limiting resistors 147, 148. When the bridge is balanced to minimize interaction between the rotary and linear control systems, any change in the error signal current provided by the rotary phase-locked control loop flows proportionately in each of transducer coils 50, 54 thereby causing a corresponding change in air pressure within each of chambers 11, 11a of cylinder 12. These balanced changes prevent translational motion of piston 13 and shaft 14 while, at the same time, allowing the rotational speed of shaft 14 to increase or decrease in response to the controlled variation in pneumatic pressure caused at orifices 22 of the air motor, thereby minimizing the magnitude of the rotational error.

The apparatus is typically prepared for operation by loading into station 25 the copy 102 which is to be read and transcribed; by loading into station 28 the image receptive material 29 to be written upon; by supplying appropriate electrical power and compressed air; and by setting switches 179, 166 to provide the desired orientation and polarity for the image which is to be written. Pneumatically-driven scanning member 14 is allowed to accelerate to its operational speed and to come under control of the rotary phase-locked loop 176, 177, 178. When the "start" command is given by the operator, member 14 translates under the control of signals derived from encoder pattern 27, 8 and ramp generator 172, and the output signals produced by photodetector 81 as copy 102 is scanned by reading laser beam 91a are fed—after signal processing—to modulator 85 of the writing laser beam 98. Beam 98a scans material 29 and exposes thereon a reproduction of part, or all, of the indicia contained in copy 102 to form the output record in writing station 28.

The term "optical," as used herein, includes use of electromagnetic waves of frequency capable of providing the desired reading and/or writing capabilities.

What is claimed is:

1. In a scanning system of the type having means for supporting an element to be scanned and rotary optical scanning means for scanning said element, the improvement comprising means for providing smooth operation of the rotary scanning means, including fluid supply means and:
   a. supporting means for supporting said rotary scanning means with fluid from said fluid supply means,
   b. motor means operated by fluid from said fluid supply means for rotating said scanning means, and
   c. translating means, driven by fluid from said fluid supply means, for translating said scanning means; said motor means and said translating means cooperating to move said scanning means to perform a scanning operation.

2. In a system for optically scanning a given area as defined in claim 1:
   a. said optical scanning means scanning said given area along a helical path in order to produce output signals, and
   b. means including indicia having a configuration relative to said helical path such that they produce synchronizing signals in said output signal for uniquely identifying the position of the helical scan within said given area.

3. In a system for scanning a given area as defined in claim 2, each indicia constituting a side of a triangular shaped area.

4. In a system for scanning an area as defined in claim 2, said indicia comprising areas of contrasting light-absorbtivity with respect to their surrounding area.

5. In a scanning system of the type having means for supporting an element to be scanned and rotary optical scanning means for scanning said element, the improvement comprising means for providing smooth operation of the rotary scanning means, including:
   a. supporting means for pneumatically supporting said rotary scanning means,
   b. air-driven motor means for rotating said scanning means, and
   c. air-driven translating means for translating said rotary scanning means along its axis of rotation.

6. In a scanning system as defined in claim 5
   a. said rotary scanning means comprising a tubular shaft enclosed at its ends to form a chamber within the shaft and having an air hole through its side wall to allow compressed air to enter said chamber,
   b. said air-driven motor means comprising a device which receives its air supply from said chamber and which discharges a jet of air to produce a reaction which rotates said rotary scanning means, said device being a part of said tubular shaft,
   c. said translating means comprising a piston element fixed to said tubular shaft, and a stationary hollow cylinder surrounding said tubular shaft, said piston, and said air inlet hole, and
   d. means for feeding compressed air to said cylinder to effect an air-pressure differential on opposite sides of said piston to translate said shaft and also to feed air from said cylinder to said device via said air hole.

7. In a scanning system as defined in claim 5
   a. said air-driven translating means having a compressed air inlet and a compressed air outlet, and
   b. said air-driven motor means including means for receiving compressed air from said compressed air outlet and comprising an air jet reaction type of motor fed by said compressed air for rotating said rotary scanning means.

8. In a scanning system as defined in claim 7
   a. said rotary scanning means including a shaft, said air-driven translating means comprising a stationary hollow cylinder coaxial with said shaft, and a piston element mounted on and affixed to said rotary scanning means for translating the rotary scanning means in one direction when the pressure on one side of the piston exceeds the pressure on the other side and for translating the piston in the opposite direction when the pressure on said other side of the piston exceeds the pressure on said one side, said supporting means comprising an air bearing at each end of said cylinder which, in cooperation with said shaft, at least partially prevents the escape of air from said cylinder, and
   b. air supply means for applying an air-pressure differential to the opposite faces of said piston.

9. In a scanning system of the type having means for supporting an element to be scanned and rotary optical scanning means for scanning said element, the improvement comprising means for providing smooth motion of the rotary scanning means in both its rotational and its translational movements including:
   a. supporting means for pneumatically supporting said rotary scanning means,
   b. air-driven translating means for axially translating said rotary scanning means, and
   c. pneumatic motor means for rotating said scanning means.

10. A scanning system as defined in claim 9
    a. said rotary scanning means including a shaft having an internal elongated chamber therein,
    b. means for feeding compressed air to said air-driven translating means to translate said rotary scanning means,
    c. said rotary scanning means defining an air passage for receiving compressed air that has been applied to said translating means and for feeding said compressed air to said chamber, and
    d. said motor means comprising means defining holes extending from the interior of said chamber to the atmosphere and inclined to produce a jet reaction torque for rotating said shaft.

11. A scanning system as defined in claim 9
    a. said rotary scanning means comprising a shaft, said translating means comprising a stationary hollow cylinder coaxial with said shaft, and a piston element movable in said cylinder and mounted upon and secured to said shaft, means for supplying air under pressure to said cylinder to apply a pressure differential to opposite sides of said piston to translate said shaft, and
    b. said supporting means comprising two air bearings respectively closing opposite ends of said cylinder and including air pressure chambers for supporting said shaft and also preventing escape of air out of the ends of said cylinder.

12. A scanning system as defined in claim 11 in which:
    a. said shaft defines the confines of an elongated air chamber extending along the axis of the shaft, b. said shaft defines an air inlet through the wall of said shaft to allow compressed air in said cylinder to enter said chamber, and c. said motor means defines air-driven jet-producing holes in the wall of the shaft and extending from the interior of said chamber to the atmosphere outside said cylinder, said jet-producing holes being inclined tangentially with respect to radii of the shaft to produce a jet reaction for rotating the shaft.

13. In a scanning system as defined in claim 9 a. said rotary scanning means comprising means for producing a scan that is made up of a series of substantially equally spaced lines in sequence and producing an output signal, and b. said element to be scanned comprising means for inserting a synchronizing signal in said output signal, said last-named means including indicia associated with said element and within the area scanned thereby causing said scanning means to produce a synchronizing signal when the scanning means scans said indicia.

14. In a scanning system as defined in claim 13, said indicia being in the path of each of said equally spaced scanning lines and varying from line to line to thus produce a synchronizing signal in the form of a series of pulses having characteristics which vary from pulse to pulse.

15. In a scanning system:

a. means for supporting an element to be scanned, b. rotary optical scanning means for scanning said element, c. supporting means, comprising air bearings, for pneumatically supporting said rotary scanning means, d. translating means responsive to differential air pressure for axially translating said rotary scanning means, e. means for applying a differential air pressure to the last-named means for translating said rotary scanning means, f. jet reaction type air-driven motor means for rotating said scanning means, said jet reaction type air-driven motor means having an air input, and g. means for feeding air applied to said translating means to said input to thereby supply air to said motor means for driving the same.

16. A scanning system as defined in claim 15 wherein:

a. said translating means comprises a cylinder closed at its opposite ends by said air bearings, each of said bearings including means to develop an air pressure which prevents the escape of air from said cylinder, b. said translating means also including a piston traversing the inside of said cylinder, and c. said cylinder having compressed air inputs adjacent its opposite ends respectively for applying compressed air to the two faces of the piston respectively.

17. In a scanning system as defined in claim 15 having a beam that scans a surface along a helical path to effect writing on said surface:

a. means for supporting a repetitive optical encoding pattern to be read by optical scanning, b. said rotary optical scanning means comprising means for helically scanning said encoding pattern with a reading beam of radiation, and c. photoelectric means responsive to the scanning of said encoding pattern for reading said encoding pattern and deriving therefrom synchronizing signals for the positional control of said first-named beam.

18. In a reading and writing facsimile scanning system:

a. means for supporting an optical encoding pattern to be read by optical scanning, b. means adjacent said optical encoding pattern for supporting an image to be read by scanning, c. rotary means for helically scanning said optical encoding pattern and said image with a beam of reading radiation, d. photoelectric means for deriving from said beam of reading radiation a first composite video signal representative of the scanning of said pattern and said image, e. electronic means for separating from said first video signal a second video signal representative only of said pattern, to produce a synchronizing signal, f. means for supporting radiation sensitive material to be written upon by scanning, g. rotary means for scanning said radiation sensitive material with a beam of writing radiation, h. means for controlling said beam of writing radiation with said first and second signals to effect writing of said image, only, on said radiation sensitive material, and i. said last-named means including (a) air-driven means for both rotating and translating said writing beam, and (b) control means to at least partially control said air-driven means by said synchronizing signal.

19. In a scanning system of the type defined in claim 18, the combination comprising:

a. rotary scanning means including means for scanning said first-named element with a beam of reading radiation, b. means for supporting an element to be written upon, c. means for writing upon said second-named element with a beam of writing radiation from said rotary scanning means, and d. means for electronically controlling said beam of writing radiation with signals derived from said beam of reading radiation.

20. A scanning system as defined in claim 19 wherein:

a. said means for supporting said first-named element is of an arcuate configuration, and b. said means for supporting said second-named element has a radius of curvature which is different from the radius of curvature of said first-named element in order to enable the writing of said image at a size which is different from the size of said first-named element.

21. In a reading and writing facsimile system as defined in claim 18, said control means controlling the speed of rotation of said writing beam.

22. In a reading and writing facsimile system as defined in claim 18, said control means controlling the translation of said writing beam.

23. In a reading and writing facsimile system as defined in claim 18, said control means controlling both the speed of rotation of, and the translation of, said writing beam.

24. In a reading and writing facsimile system as defined in claim 18, said control means controlling the speed of rotation of both said reading and writing beams.

25. In a reading and writing facsimile system as defined in claim 18, said control means controlling the translation of both said reading and writing beams.

26. In a reading and writing facsimile system as defined in claim 18, said control means controlling both the speed of rotation of, and the translation of, both of said reading and writing beams.

27. In a scanning system of the type having means for supporting an element to be scanned and rotary optical scanning means having a longitudinal axis for scanning said element, the improvement comprising means for providing smooth operation of the rotary optical scanning means, including:
  a. air pressure differential producing means,
  b. support means connected to said air pressure differential producing means to provide an air pressure differential that supports said rotary optical scanning means, and
  c. motor means connected to said air pressure differential producing means to apply an air pressure differential for rotating said optical scanning means about its longitudinal axis.

28. A scanning system as defined in claim 27, including translating means connected to said air pressure differential producing means and responsive to the application of a pressure differential for translating said rotary scanning means along its axis of rotation.

29. In a scanning system as defined in claim 28
  a. said rotary optical scanning means comprising a tubular shaft enclosed adjacent its ends to form a chamber within the shaft and having a first orifice in its side wall,
  b. said motor means for rotating said scanning means comprising a motive power device which is a part of said tubular shaft and which defines a ring of orifices which produces a torque which rotates said rotary optical scanning means, and
  c. said translating means comprising a piston element fixed to said tubular shaft; a stationary hollow cylinder surrounding said tubular shaft, said piston, and said first orifice; and means connected to said air pressure differential producing means, for applying an air pressure differential to opposite sides of said piston to translate said shaft,
  d. said air pressure producing means being connected to said ring of orifices via said cylinder, said first orifice and said chamber.

30. In a scanning system as defined in claim 28
  a. said translating means having an inlet and an outlet subjected to an air pressure differential, and
  b. said means for rotating said optical scanning means comprising an air pressure-differential-sensitive motor.

31. In a scanning system as defined in claim 30
  a. said rotary optical scanning means including a shaft, said translating means comprising a stationary hollow cylinder coaxial with said shaft, and a piston element mounted on and affixed to said rotary scanning means for translating the rotary scanning means in one direction when the air pressure on one side of the piston exceeds the air pressure on the other side, and for translating the piston in the opposite direction when the air pressure on said other side of the piston exceeds the air pressure on said one side, said supporting means comprising an air bearing at each end of said cylinder which, in cooperation with said shaft, at least partially preserves the desired air pressure differential between said cylinder and the atmosphere, and
  b. means, connected to said air pressure producing means, for applying an air pressure differential to the opposite faces of said piston.

32. Apparatus for optically scanning an original pattern and an optical encoding area, and for reproducing portions thereof on a radiation sensitive receiving surface, comprising:
  a. laser means for producing a beam of reading radiation,
  b. laser means for producing a beam of writing radiation,
  c. optical means for selectively illuminating the original pattern with said beam of reading radiation,
  d. optical means for selectively activating the radiation sensitive receiving surface with said beam of writing radiation,
  e. pneumatically-actuated scanning means for simultaneously scanning said original pattern and said radiation sensitive receiving surface with said reading and writing radiation beams respectively,
  f. means for deriving from said reading radiation beam a first signal representative of said original pattern and said encoding area,
  g. means for separating from said first signal a second signal representative of the location of said beam of reading radiation relative to said encoding area,
  h. means for subtracting said second signal from said first signal to obtain a third signal representative of desired portions of said original pattern,
  i. means for quantizing said third signal, and
  j. means for controlling the intensity of said beam of writing radiation in accordance with said quantized signal to reproduce said original pattern on said radiation sensitive receiving surface.

33. An optical scanning apparatus for a facsimile reading and writing system comprising:
  a. arcuately-shaped members for supporting thereon materials to be read and to be written upon, respectively, by scanning beams of radiation,
  b. a cylindrical pneumatic chamber having an air-input orifice adjacent to each of its ends, each said orifice being coupled to a separate modulated source of pneumatic pressure,
  c. annular air bearings axially aligned with and secured to opposite ends of said cylindrical pneumatic chamber for pneumatically and coaxially supporting an elongated, hollow, cylindrical shaft adapted for rotation therewithin,
  d. piston means secured to said shaft in sliding, pressure-sealing relationship with the interior of said pneumatic chamber, for imparting translational motion to said shaft,
  e. means for pressurizing said air bearings to provide substantially friction-free support for said shaft and for impeding the escape of air from said pneumatic chamber,
  f. an air motor for imparting rotation to said shaft, including air outlets communicating with the interior of said shaft,
  g. said shaft defining an orifice in its side wall for connecting said interior to said pneumatic chamber to supply pressurized air to said air motor, h. electro-mechanical means for controlling the motion of said shaft by modulating the pressure gradient between the two compartments formed within said pneumatic chamber,
i. means for passing a collimated beam of reading radiation axially into a first end of said shaft and for focusing said beam on said material to be read,
j. means for deriving electronic signals representative of indicia read from said material,
k. means for modulating a source of writing radiation with said electronic signals,
l. means for passing a collimated beam of modulated writing radiation axially into a second end of said shaft, and
m. means for focusing said beam of modulated writing radiation on said material to be written upon for the purpose of recording thereon information transferred from said material to be read.

34. In a system for optically scanning a given area:
a. scanning means for optically scanning said area along a series of parallel paths and producing an output signal, and
b. means, including triangular indicia along a line that is substantially perpendicular to said scanning paths and within said scanning area, for inserting a synchronizing signal in said output signal, there being a plurality of triangular indicia along said line.

35. In a system for optically scanning a given area:
a. scanning means for optically scanning said area along a series of parallel paths and producing an output signal, and
b. means, including triangular indicia along a line that is substantially perpendicular to said scanning path and within said scanning area, for inserting a synchronizing signal in said output signal,
said indicia covering triangular-shaped areas with one side of each triangle perpendicular to said scanning paths, there being a plurality of triangular indicia along said line.

* * * * *